Oct. 29, 1963     A. E. KETLER, JR     3,108,611

PRESSURE REGULATOR

Original Filed April 13, 1960

INVENTOR
ALBERT E. KETLER, JR.

BY

AGENT

ATTORNEYS

3,108,611
PRESSURE REGULATOR
Albert E. Ketler, Jr., Cincinnati, Ohio, assignor, by mesne assignments, to the United States of America as represented by the Secretary of the Navy
Original application Apr. 13, 1960, Ser. No. 22,068, now Patent No. 3,027,971, dated Apr. 3, 1962. Divided and this application Mar. 30, 1961, Ser. No. 99,645
2 Claims. (Cl. 137—494)

This application is a division of application Serial No. 22,068, filed April 13, 1960, now Patent No. 3,027,971, for Engine Lubrication System.

The present invention relates to a differential pressure regulator and more particularly to a differential pressure regulator having a plurality of outlets for maintaining the pressure in the outlets at a predetermined percentage of each other.

Prior to this time, the problem of pressurizing an area to a ratio of some other pressure by using a single valve has never been known to the applicant. The present invention eliminates the need of a second valve to control the second pressure.

The present invention employs a single valve to maintain the pressure of one outlet at a predetermined ratio of the other outlet. It accomplishes this by employing a diaphragm which has both sides subjected to pressure. The pressure ratio is controlled by a diaphragm which has unequal areas exposed to pressure thereby producing the desired pressures in response to the respective areas exposed to pressure.

An object of the present invention is the provision of a pressure regulator which is inexpensive to manufacture and does not require close machining tolerances in its manufacture.

Another object of the present invention is to provide a pressure regulator which will never get out of adjustment because it utilizes a sliding valve instead of the usual sensitive, spring loaded type needle valve.

Still another object of the present invention is the provision of a valve which will maintain one outlet pressure at a predetermined percentage of the other outlet pressure.

Other objects and many of the attendant advantages of this invention will be readily appreciated as the same becomes better understood by reference to the following detailed description when considered in connection with the accompanying drawings wherein.

Figure 1:
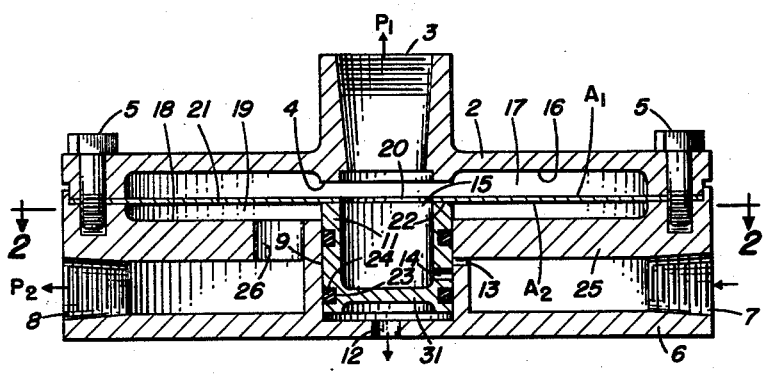
FIG. 1 shows a side elevation of the apparatus in section.

Referring now to the drawings, wherein like reference characters designate like or corresponding parts throughout the several views, there is shown in FIG. 1, which illustrates a preferred embodiment of the invention, a lower body portion 6 and an upper body portion 2, said upper body portion 2 having a centrally located fluid pressure outlet 3. The under side 16 of the upper body portion 2 is provided with a annular valve stop 4, while suitable means, such as bolts 5, may be used to secure the upper body portion 2 to the lower body portion 6.

The lower body portion 6 has a fluid pressure inlet 7 which admits the fluid under pressure which is to be controlled. The lower body portion is also provided with a pressure outlet 8. In the center portion of the lower body 6 there is a centrally located bore or recess 9 which is adapted to receive a sliding valve 11. The base of the bore 9 is provided with an aperture or vent opening 12 which leads to the atmosphere thereby preventing buildup of pressure underneath valve 11. The vertical wall of bore 9 is provided with an orifice 13 which serves as the fluid admitting passage which permits the incoming fluid to pass through aperture 14 in the vertical wall of the sliding valve 11 allowing access to the upper chamber 17 and pressure outlet 3.

Sliding valve 11 takes the form of an annular member having a diameter slightly less than the recess 9 within which it operates. The valve 11 is a hollow cylinder with hollow portion 15 having a base portion 31 with an aperture 14 in its vertical wall. The valve 11 is open at its top and a diaphragm 21 is fixedly secured to the upper peripheral portion 22 of the valve 11. Any suitable securing means may be used such as welding, brazing, etc. Valve 11 is further provided with a pair of annular grooves 23 in its outer surface. One groove is located above the aperture 14 and the other groove is located below aperture 14. Disposed within grooves 23 are a pair of annular O-rings which seal the valve 11 with respect to the bore 9 to prevent any leakage of fluid therebetween.

Upper body portion 2 is provided with a recess in its underside 16 and the lower body portion 6 is recessed on its upperside 18. When the valve 11 is placed in the bore 9 and the diaphragm 21 is held in place by the upper body portion 2 an upper and lower chamber 17 and 19, respectively, is formed by the walls of these recesses and the side of the diaphragm 21.

Diaphragm 21 serves as a common dividing wall between said chambers. The diaphragm 21 is provided with an annular opening 20 which is the same diameter as the hollow portion 15 of sliding valve 11.

Area A1 is that area which is formed by the upper face of diaphragm 21, area A2 is that area which is formed by the lower face of diaphragm 21. Area A2 is smaller than area A1 by an amount equal to the area within outer diameter of sliding valve 11.

It is to be understood that the diameter of sliding valve 11 can be varied so as to produce different pressure ratios.

In order to provide a wider range of pressure control, bore 9 can be made considerably larger and different diameter sliding valves and diaphragms may be used depending on the desired pressure ratios. For example, if it is desired to increase the ratio of the pressures P1 with respect to P2, a bushing, the exact width of which would depend on the desired pressure ratio, may be inserted into bore 9 and a smaller outer diameter valve 11 may be used. By using a smaller outer diameter valve 11, the ratio of the effective areas A2 with respect to area A1 is decreased, that is, it is brought closer to unity.

Since the pressure P2 remains constant for a given application and the area A1 also remains constant, it can readily be seen that by increasing the effective area A2 you also increase the pressure P1.

Figure 2:
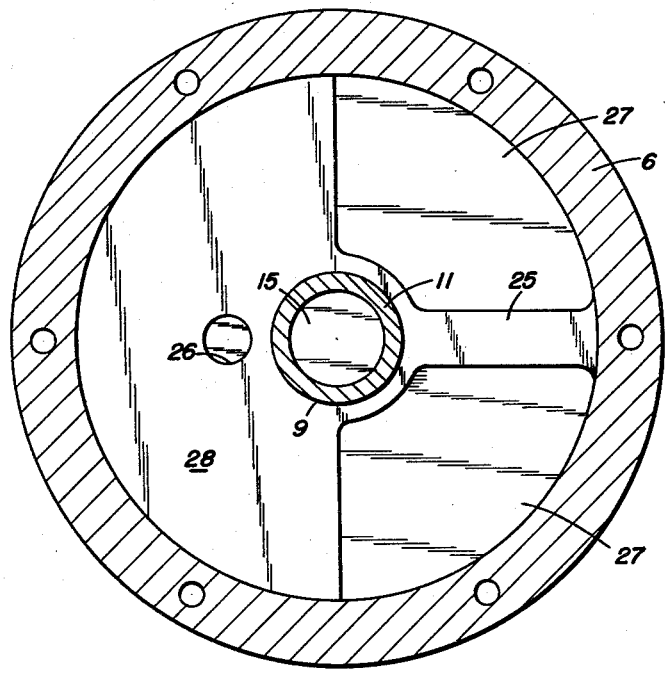
FIG. 2 shows a section of the device taken on the line 2—2 of FIG. 1 looking in the direction of the arrows.

FIG. 2, which is a sectional view taken along line 2—2 of FIG. 1, shows a supporting web 25 which supports the sliding valve 11. Also shown in FIG. 2 is the bore 26 which communicates with pressure outlet 8. The right hand side of the lower body portion 6 is open to chamber 19 through openings 27, whereas the left hand side is provided with a partition 28 that separates chamber 19 from outlet 8, communication with outlet 8 being provided through bore 26.

Assuming the ratio of the area A2 to area A1 as being .85 the operation of the device is as follows: fluid under pressure enters the regulator through inlet 7, passing on either side of web 25 through openings 27 and enters chamber 19. Area A2, which has been identified above, is exposed to this pressure. Fluid is allowed to exit from lower chamber 19 through bore 26 and out through pressure outlet 8. It is to be understood, that in order for this regulator to function properly, it must first be connected up to a system, outlet 8 being connected to one area to be controlled and outlet 3 being connected to the area which is to be maintained at a predetermined percentage of the pressure within the first mentioned area. Pressure outlet 3 is connected to the area which is to be maintained at 85% of the pressure exhausting from outlet 8. As long as the pressure in outlet 3 is 85% of the pressure in outlet 8, the diaphragm 21 will remain in its horizontal or unflexed position, since the force created by P1A1 is equal to the force created by P2A2 and there is a state of equilibrium between the respective areas and the pressure exerted thereon. However, should the pressure in the outlet 3 diminish or decrease, then the force created by the pressure within lower chamber 19 acting on area A2 will overcome the force created by the pressure within the upper chamber 17 acting on the area A1 and will thus force the diaphragm to move upwardly. Since the sliding valve 11 is fixedly secured to the diaphragm 21, valve 11 will also move upwardly, the aperture 14 in the vertical wall of sliding valve 11 moves upwardly also and comes into alignment with orifice 13. As this occurs, fluid is permitted to flow from inlet 7 through orifice 13, through aperture 14 in the sliding valve 11 and then through the center of sliding valve 11 and out through outlet 3.

Fluid will continue to flow through outlet 3 until the pressure in upper chamber 17 builds up to a point sufficiently high to overcome the force created by the pressure acting on area A2. When this occurs, diaphragm 21 is returned to its horizontal or equilibrium position and when this is accomplished, sliding valve 11 is returned to its original position and aperture 14 is lowered sufficiently below orifice 13 so as to cut off the flow of fluid therethrough.

Obviously many modifications and variations of the present invention are possible in the light of the above teachings. It is therefore to be understood that within the scope of the appended claims, this invention may be practiced otherwise than as specifically described.

What is claimed is:

1. A pressure regulator for controlling the ratio of fluid outlet pressures, the improvement comprising, an upper and lower body portion, a flexible member fixedly secured intermediate said upper and lower body portions, upper chamber means formed by said upper body portion and said flexible member, lower chamber means formed by said lower body portion and said flexible member, a recess in the wall of said lower body portion, a sliding valve member disposed in said recess, said flexible member being attached in sealed relationship to the extremity of said valve member which extends from said recess, a fluid inlet in said lower body portion, an orifice on said lower body portion connecting said inlet with said recess, a conduit means in said valve member for establishing fluid flow between said orifice and said upper chamber when said valve member is in the position whereby the conduit and orifice are aligned, communication means in said lower body portion for supplying fluid from said inlet to said lower chamber means, first outlet means for said lower chamber means, and second outlet means for said upper chamber means.

2. A pressure ratio regulator for controlling the ratio of fluid outlet pressures comprising in combination, an upper body portion and a lower body portion, a flexible member fixedly secured intermediate said upper and lower body portions, upper chamber means formed by said upper body portion and said flexible member, lower chamber means formed by said lower body portion and said flexible member, said upper and lower chamber means each being provided with a fluid outlet, a bore in said lower body portion, a circular valve means slidably disposed in said bore, said flexible member being secured in sealed relationship about the circumference of the circular end of said valve means which extends into said lower chamber means, a valve chamber disposed within said valve means which is in communication with said upper chamber means through said flexible member, an inlet means in said lower body portion for supplying fluid to said lower chamber means, an orifice means for establishing communication between said inlet and said bore, a passage means in said valve means for establishing communiaction between said valve chamber and said orifice means when said valve means is at the position whereby the orifice means and passage means are aligned, and a vent means for venting said bore to atmosphere, whereby the area on the end of said valve means which extends into said lower chamber means between the circumference of said valve and said valve chamber establishes the pressure ratio maintained between said upper and lower chamber means and whereby a bushing may be inserted into said bore to accommodate different sized valve means to thereby effect different pressure ratios between said upper and lower chamber means.

References Cited in the file of this patent

UNITED STATES PATENTS

| | | |
|---|---|---|
| 973,609 | Abrams | Oct. 25, 1910 |
| 1,302,538 | Gulick | May 6, 1919 |
| 2,831,493 | Richmond | Apr. 22, 1958 |
| 2,844,161 | Ostwald | July 22, 1958 |